US012506298B2

(12) United States Patent
Tian et al.

(10) Patent No.: US 12,506,298 B2
(45) Date of Patent: Dec. 23, 2025

(54) CONNECTOR POSITION ASSURANCE DEVICE AND CONNECTOR ASSEMBLY INCLUDING SAME

(71) Applicant: Aptiv Technologies AG, Schaffhausen (CH)

(72) Inventors: Xiaoxian Tian, Shanghai (CN); Haifei Guan, Shanghai (CN)

(73) Assignee: Aptiv Technologies AG, Schaffhausen (CH)

(*) Notice: Subject to any disclaimer, the term of this patent is extended or adjusted under 35 U.S.C. 154(b) by 359 days.

(21) Appl. No.: 17/994,670

(22) Filed: Nov. 28, 2022

(65) Prior Publication Data

US 2023/0198201 A1 Jun. 22, 2023

(30) Foreign Application Priority Data

Dec. 17, 2021 (CN) ........................ 202111552425.X

(51) Int. Cl.

*H01R 13/627* (2006.01)
*H01R 13/46* (2006.01)
*H01R 13/629* (2006.01)
*H01R 13/639* (2006.01)

(52) U.S. Cl.

CPC ......... *H01R 13/6271* (2013.01); *H01R 13/46* (2013.01); *H01R 13/62911* (2013.01); *H01R 13/639* (2013.01)

(58) Field of Classification Search

CPC ................ H01R 13/6271; H01R 13/46; H01R 13/62911; H01R 13/639
USPC .......................................................... 439/352
See application file for complete search history.

(56) References Cited

U.S. PATENT DOCUMENTS

| | | | | |
|---|---|---|---|---|
| 7,255,593 | B2 | 8/2007 | Tyler | |
| 7,785,146 | B2 | 8/2010 | Chazottes et al. | |
| 7,909,638 | B2 | 3/2011 | Seo et al. | |
| 9,281,619 | B2 | 3/2016 | Morello et al. | |
| 9,350,116 | B1 | 5/2016 | Morello et al. | |
| 9,362,676 | B2 | 6/2016 | Puhl et al. | |
| 9,490,576 | B2 * | 11/2016 | Plazio | H01R 13/639 |
| 9,705,228 | B2 | 7/2017 | Caldwell et al. | |
| 9,929,508 | B2 | 3/2018 | Puhl et al. | |

(Continued)

FOREIGN PATENT DOCUMENTS

| | | |
|---|---|---|
| CN | 209169520 U | 7/2019 |
| CN | 214542638 U | 10/2021 |

(Continued)

OTHER PUBLICATIONS

"Extended European Search Report Received mailed on May 4, 2023", 9 Pages.

*Primary Examiner* — Tulsidas C Patel
*Assistant Examiner* — Thaslimur Rahman
(74) *Attorney, Agent, or Firm* — Billion & Armitage

(57) ABSTRACT

A connector position assurance (CPA) device includes a body and a primary lock which extends from the body in a first direction and has a primary locking mechanism at a distal end away from the body. The CPA device further includes two beam portions which are disposed on both sides of the body and extend in the first direction. At least a part of each of the two beam portions is connected to the body. The beam portion includes a secondary locking mechanism that protrudes outwards from an outer side of the beam portion.

9 Claims, 7 Drawing Sheets

(56) References Cited

U.S. PATENT DOCUMENTS

| | | | |
|---|---|---|---|
| 9,929,509 B1 | 3/2018 | Penn et al. | |
| 9,979,131 B2 | 5/2018 | Venkatesan et al. | |
| 2001/0027058 A1* | 10/2001 | Pederson | H01R 13/6272 439/595 |
| 2017/0250502 A1* | 8/2017 | Endo | H01R 13/641 |
| 2020/0136310 A1* | 4/2020 | Nishiyama | H01R 13/6272 |
| 2022/0285881 A1 | 9/2022 | Schmidt et al. | |

FOREIGN PATENT DOCUMENTS

| | | | |
|---|---|---|---|
| EP | 2876744 | B1 | 9/2019 |
| EP | 3703196 | A1 | 9/2020 |
| GB | 2599908 | B | 1/2023 |
| WO | 2009047744 | A2 | 4/2009 |

* cited by examiner

CONNECTOR POSITION ASSURANCE DEVICE AND CONNECTOR ASSEMBLY INCLUDING SAME

CROSS-REFERENCE TO RELATED APPLICATION

This application claims benefit of priority to Chinese Patent Application No. 202111552425.X filed on Dec. 17, 2021, the entire disclosure of which is hereby incorporated by reference.

TECHNICAL FIELD OF THE INVENTION

The present disclosure relates to a connector position assurance device and a connector assembly including such a connector position assurance device.

BACKGROUND

With the progress of the electronics industry, various electrical connectors are used in communication devices, electrical devices and the like, in order to provide power and data connections between different circuits, equipment, and the like. Such connection may be temporary and may be closed or opened at any time or it may be a permanent connection. However, the connecting ends of an electrical connector (for example, a plug connector and a socket connector) requires a locking mechanism after the male and female ends are mated with each other to avoid unexpectedly disconnecting the connecting ends of the electrical connector due to mishandling or external force.

For this reason, there is an existing locking mechanism for improving the reliability, that is, a connector position assurance (CPA) device which can fix or lock the plug connector when the plug connector is inserted into the socket connector or other connector, thereby inhibiting unexpected disconnection from the plug connector or other connectors due to mishandling or external force.

SUMMARY

The object of the present application is to provide a connector position assurance device and a connector assembly with the connector position assurance device.

In an embodiment of the present disclosure, a connector position assurance device is provided. The connector position assurance device includes a body and a primary lock which extends from the body in a first direction and has a primary locking mechanism at a distal end away from the body. The connector position assurance device further includes two beam portions which are disposed on both sides of the body and extend in the first direction. At least a part of each of the two beam portions is connected to the body. The beam portion includes a secondary locking mechanism that protrudes outwards from an outer side of the beam portion.

In an embodiment of the present disclosure, the beam portion further includes a pre-locking mechanism which is located behind the locking mechanism in the first direction.

In an embodiment of the present disclosure, the primary lock further includes a first arm which extends from the body in the first direction; and a second arm which extends from the body in the first direction and is spaced apart from the first arm.

In an embodiment of the present disclosure, the primary locking mechanism extends between the first arm and the second arm.

In an embodiment of the present disclosure, a limit mechanism is further included, which protrudes from the body along the first direction between the first arm and the second arm.

In an embodiment of the present disclosure, the body includes a boss between the beam portion and the body.

In an embodiment of the present disclosure, the boss supports the pre-locking mechanism of the beam portion, and the pre-locking mechanism is located behind the secondary locking mechanism in the first direction.

In an embodiment of the present disclosure, the boss includes one or more recesses.

In one embodiment of the present disclosure a connector assembly is provided. The connector includes a connector including a housing which has locking grooves on both sides and a flexible control part located at top of the housing. The flexible control part contains a free end and a fixed end secured to the top. The connector also includes a connector position assurance device as described above. The connector position assurance device is configured movably on the connector, when the connector position assurance device is moved to a locking position, connector position assurance device when the secondary locking mechanism is snapped into the locking groove, and the primary locking mechanism extends into the position below the flexible control part and abuts against the fixed end, so that the depression of the free end is suppressed. The secondary locking mechanism slides out from the locking groove and the abutting state of the primary locking mechanism, and the fixed end is released when the connector position assurance device is moved away from the locking position so that the suppression to the depression of the flexible control part is lifted.

In one embodiment of the present disclosure a connector assembly is provided. The connector assembly has a connector including a housing which includes locking grooves and pre-locking grooves on both sides and a flexible control part located at top of the housing. The flexible control part comprising a free end and a fixed end secured to the top; and the connector position assurance device of any of the preceding embodiments. The pre-locking groove is located behind the locking groove in the first direction. The connector position assurance device is configured movably on the connector and limits the movement of the connector position assurance device by snapping the pre-locking mechanism into the pre-locking groove. The secondary locking mechanism is snapped into the locking groove and the primary locking mechanism extends into the position below the flexible control part and abuts against the fixed end when the connector position assurance device is moved to a locking position so that the depression of the free end is suppressed. The secondary locking mechanism slides out from the locking groove and the abutting state of the primary locking mechanism, and the fixed end is released when the connector position assurance device is moved away from the locking position so that the suppression to the depression of the flexible control part is lifted.

According to the present disclosure, the auxiliary pressing mechanism on the top of the connector position assurance device may be omitted, thereby simplifying the connector assembly design, improving production efficiency when building the connector assembly, and reducing the production cost of the connector assembly, while ensuring that the customer has a better operating feeling when using it.

In addition, according to the present disclosure, both of the pre-locking mechanism and the secondary locking mechanism of the connector position assurance device can be integrated on the beam portion so that the pre-locking mechanism and the locking mechanism of the connector position assurance device can be sturdier and more stable.

Further, according to the present disclosure, the primary locking mechanism and the secondary locking mechanism of the connector position assurance device can employ a separate design and the primary locking mechanism has a larger space, so that the primary locking mechanism can provide a larger blocking force.

In addition, according to the present disclosure, a boss can be added on the lower side of the body so that the pull-out force of the product can be improved.

BRIEF DESCRIPTION OF THE DRAWINGS

The present invention is now described, by way of example with reference to the accompanying drawings, in which.

DETAILED DESCRIPTION

Figure 1:
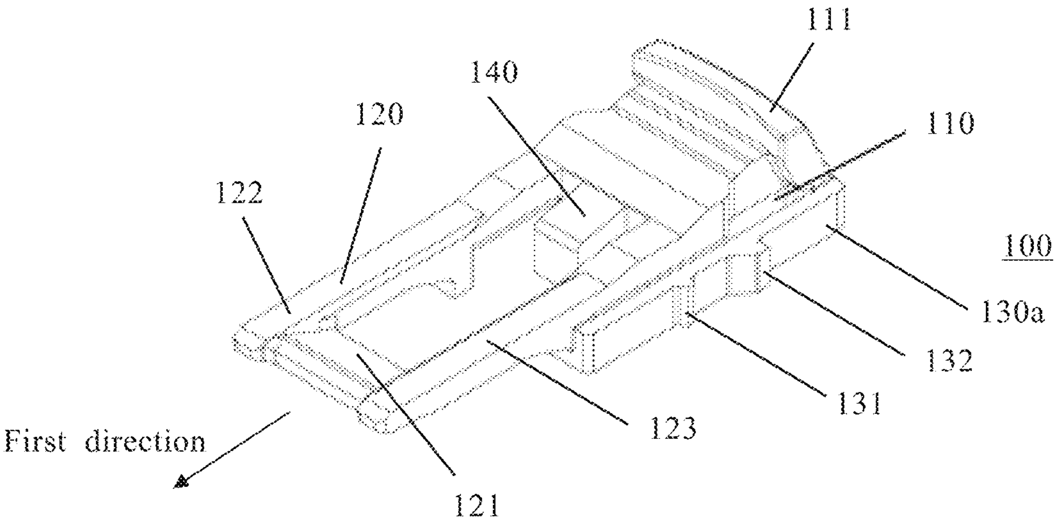
FIG. 1 is a top-down isometric view illustrating a connector position assurance device according to an embodiment of the present disclosure.

The present disclosure will be described below with reference to embodiments. Those skilled in the art can clearly understand other advantages and technical effects of the present disclosure from the contents disclosed in this specification. In addition, the present disclosure is not limited to the following specific embodiments but can also be implemented or applied through other different embodiments, and for each specific content in this specification, various modifications and changes can be made without departing from the spirit of the present disclosure.

Embodiments of the present disclosure will be described in detail based on the accompanying drawings. It should be first clarified that the listed figures are only for simplifying the description, and are not drawn according to the actual size, and do not reflect the actual size of the relevant structures. To facilitate understanding, same reference numerals have been used in the various figures to refer to the same elements that are common to the figures. The figures are not drawn to scale and may be simplified for clarity. Elements and features of one embodiment may be advantageously incorporated in other embodiments without further recitation.

It should be clarified that the term "in the direction of" in the present application is not limited to mean completely along the direction or parallel to the direction, but may also mean substantially along the direction, generally along the direction or parallel to length direction and this direction The directions are approximately parallel. In this application, the term "side" is not limited to mean an edge but can also mean a line on one side or side.

Hereinafter, an embodiment of the connector position assurance device 100 according to the present disclosure will be described with reference to FIGS. 1 to 2.

Figure 2:
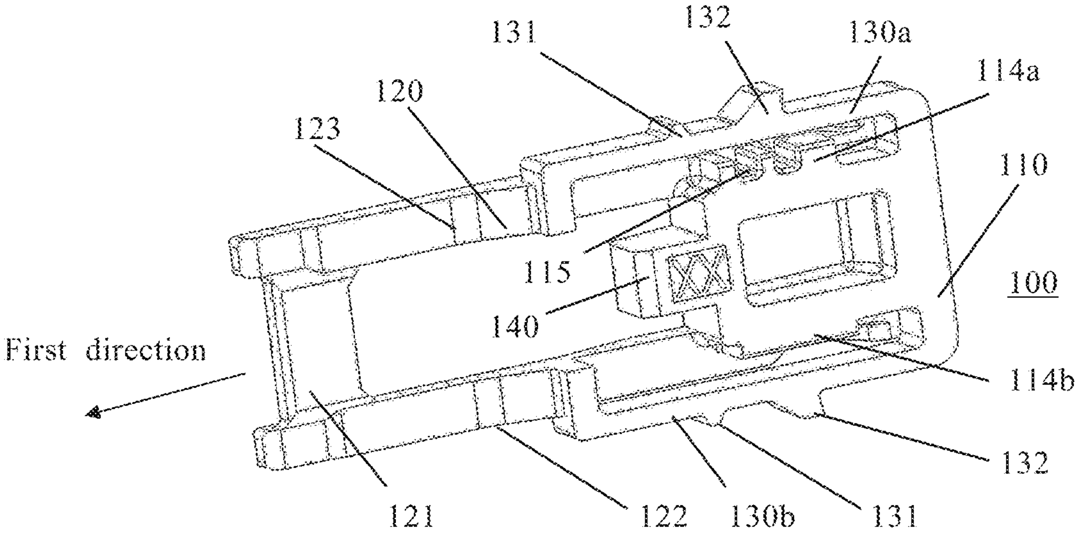
FIG. 2 is a bottom view illustrating a connector position assurance device according to an embodiment of the present disclosure.

FIG. 1 is a top-down isometric view of the structure of the connector position assurance device 100 according to the present embodiment, and FIG. 2 is a bottom view of the structure of the connector position assurance device 100 according to the present embodiment.

As shown in FIGS. 1 and 2, the connector position assurance device 100 may include a body 110, a primary lock 120, and beam portions 130*a*, 130*b*. Optionally, the connector position assurance device 100 may include a limiting mechanism 140.

The body 110 may serve as a body of the connector position assurance device 100. Optionally, as an example, as shown in FIG. 1, the body 110 may include an auxiliary moving mechanism 111, and a user or an external device can help move the connector position assurance device 100 by pushing or pulling the auxiliary moving mechanism 111. The auxiliary moving mechanism 111 is not limited to the shape shown in FIG. 1, but may have any suitable shape, such as a convex plate, a convex rod, and the like.

The primary lock 120 may extend from the body 110 along the first direction. The primary lock 120 may have a primary locking mechanism 121 at a distal end away from the body 110. The primary locking mechanism 121 can be used to abut against the fixed end of the flexible control part of the connector as described below. Although the primary locking mechanism 121 shown in FIGS. 1 and 2 has a flat plate shape, the primary locking mechanism 121 may have any suitable shape such as a cylinder, an elliptical cylinder, a drum shape, a terrace shape, etc.

As an embodiment, as shown in FIGS. 1 and 2, the primary lock 120 may include a first arm 122 and a second arm 123. The first arm 122 and the second arm 123 extend from the body 110 in the first direction. The first arm 122 is spaced apart from the second arm 123. The first arm 122 and the second arm 123 may be substantially parallel, but the first arm 122 and the second arm 123 may also be formed with distal ends close to each other (that is, extending inward) or away from each other (that is, extending outwards), or any other suitable positional relationship. As shown in FIGS. 1 and 2, the primary locking mechanism 121 may extend between the first arm 122 and the second arm 123.

However, the structure of the primary lock 120 is not limited to the structure shown in FIGS. 1 and 2 but may have any other suitable structures. As an example, the primary lock 120 may have only one arm or more than two arms, or the primary lock 120 may be a flat plate with a hole or slot in the central segment thereof, a convex plate, or a concave plate, etc.

The beam portions 130*a*, 130*b* may be disposed on both sides of the body 110 and extend in the first direction. At least a portion of each of the beam portions 130*a*, 130*b* is connected to the body 110. The shapes of the beam portions 130*a*, 130*b* are not limited to the shapes shown in FIGS. 1 and 2, and any other suitable shapes may be employed, such as a rod shape, a triangular prism shape, an elliptical column shape, or a cylindrical shape bent inwardly or outwardly, etc. Preferably, one or both of the beam portions 130*a*, 130*b* may be formed in a simply supported beam type structure, but any other suitable structures, e.g., the structures such as a continuous beam, an overhanging beam, etc., may also be used.

In addition, the beam portions 130*a*, 130*b* may include a secondary locking mechanism 131 that protrudes outwardly from the outer sides of the beam portions 130*a*, 130*b*. Preferably, the secondary locking mechanism 131 may be arranged to be symmetrically positioned on the outer side of each of the beam portions 130*a*, 130*b*, as shown in FIGS. 1 and 2. Although FIGS. 1 and 2 show the inclusion of two secondary locking mechanisms 131, only one secondary locking mechanism 131 or more than two secondary locking mechanisms 131 may be included.

Optionally, the beam portions 130*a*, 130*b* may include a pre-locking mechanism 132. The secondary locking mechanism 131 and the pre-locking mechanism 132 are spaced apart in the first direction. For example, as shown in FIGS. 1 and 2, the pre-locking mechanism 132 may be located behind the secondary locking mechanism 131 in the first direction. The pre-locking mechanism 132 protrudes outwards from the outer sides of the beam portions 130*a*, 130*b*. As a preferred embodiment, the pre-locking mechanism 132 may have a protruding height greater than the protruding height of the secondary locking mechanism 131. As a non-limiting example, the protruding height of the pre-locking mechanism 132 may be five to several tens of times the protruding height of the secondary locking mechanism 131. Preferably, similar to the secondary locking mechanism 131, the pre-locking mechanism 132 may be arranged to be symmetrically positioned on the outer side of each of the beam portions 130*a*, 130*b*, as shown in FIGS. 1 and 2. Although FIGS. 1 and 2 show the inclusion of two pre-locking mechanisms 132, only one secondary locking mechanism 131 or more than two pre-locking mechanisms 132 may be included.

Alternatively, as shown in FIG. 2, the body 110 may include bosses 114*a*, 114*b* formed between the beam portions 130*a*, 130*b* and the body 110. The bosses 114*b* can support the pre-locking mechanism 132 when the connector position assurance device 100 is removed from the body of a connector (not shown) (e.g., a connector like connector 210 described in detail below) to support the pre-locking mechanism 132, in order to enable a greater retention force. In order to achieve a better effect of supporting, the gap between the boss 114*a* and the beam portion 130*a* can be formed to be smaller. In order to ensure that the boss 114*a* can be easily molded, the boss can be designed to have one or more recesses 115, which can enhance the strength of the mold core and facilitate the production. Since a better supporting effect can be provided by the boss 114*a*, the gap between the boss 114*b* and the beam portion 130*b* can be formed to be larger, and the function of the boss 114*b* can be realized with such a gap without material relief. Although FIG. 2 shows the inclusion of two bosses 114*a*, 114*b*, only one boss or more than two bosses may be included. Although FIG. 1 shows that boss 114*a* includes recess 115 and boss 114*b* does not include recess 115, either or both of bosses 114*a* and 114*b* may or may not include recesses 115.

Optionally, the connector position assurance device 100 may include a limiting mechanism 140 that protrudes from the body 110. As an example, as shown in FIGS. 1 and 2, the limiting mechanism 140 may extend between the first arm 122 and the second arm 123 along the first direction. The limiting mechanism 140 can be formed as a boss, and can also be formed into other suitable shapes, such as a convex piece or a convex ball.

Hereinafter, another embodiment of the connector assembly 200 according to the present disclosure will be described with reference to FIGS. 3 to 6.

Figure 3:
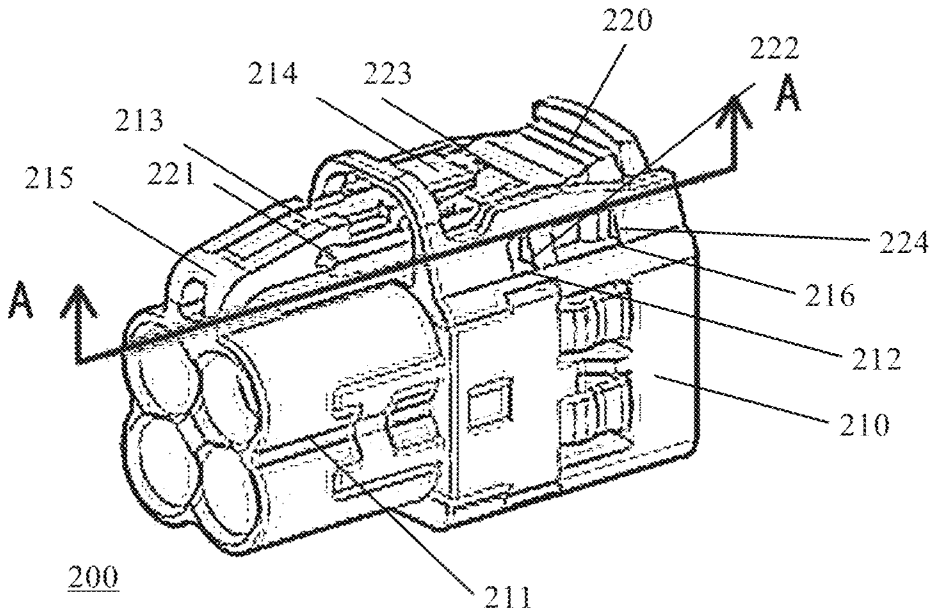
FIG. 3 is an isometric view illustrating a connector according to an embodiment of the present disclosure.
Figure 8:
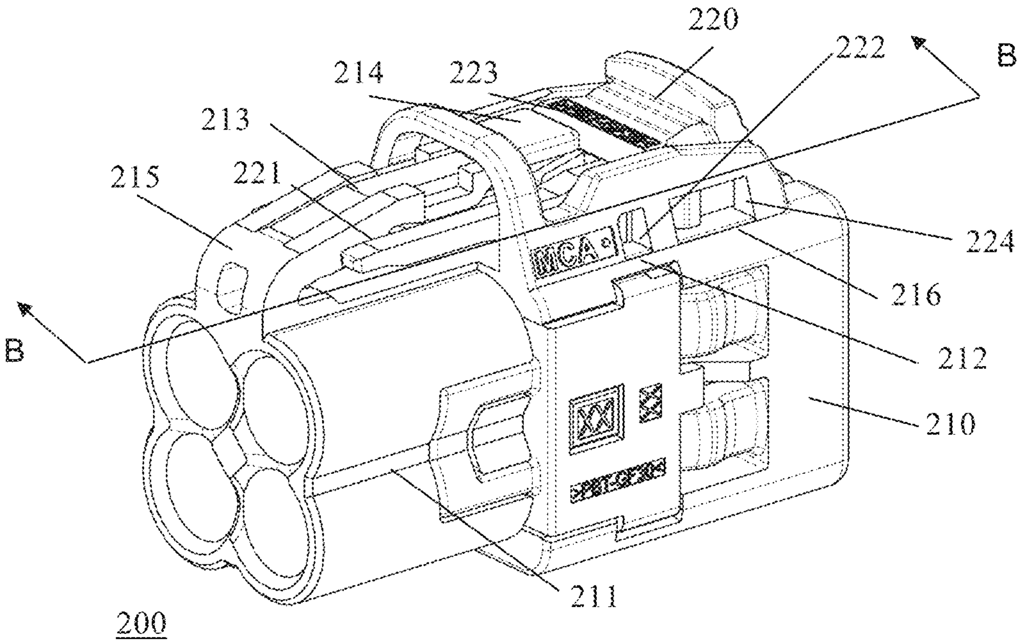
FIG. 8 is an isometric view illustrating a connector assembly according to an embodiment of the present disclosure.

FIGS. 3 and 8 are isometric views of the connector assembly 200.

As shown in FIGS. 3 and 8, the connector assembly 200 may include a connector 210 and a connector position assurance device 220. The connector position assurance device 220 is movably provided on the connector 210.

The connector position assurance device 220 of the connector assembly 200 may be any type or form of the connector position assurance device described in the above-mentioned embodiments, and thus will not be repeated here.

Figure 4:
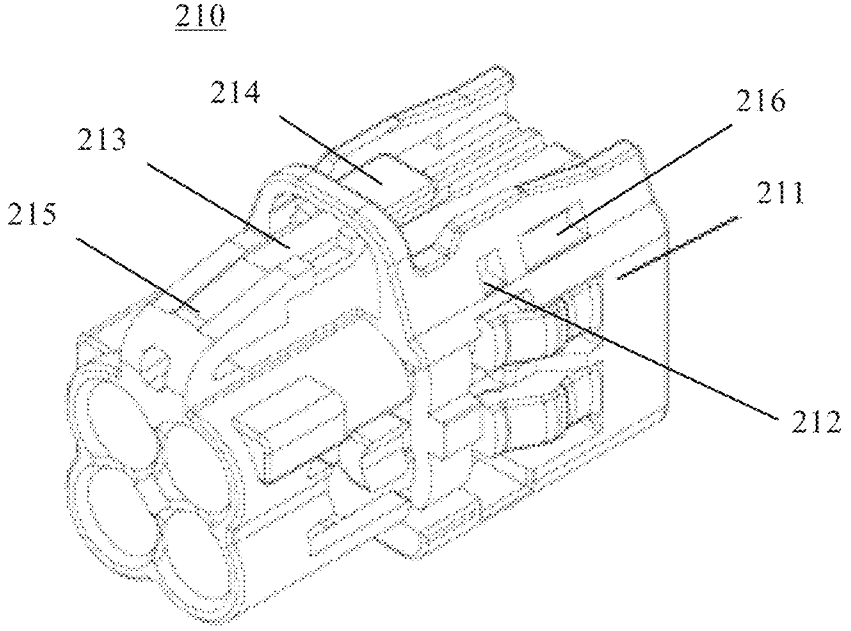
FIG. 4 is an isometric view illustrating a connector assembly according to an embodiment of the present disclosure.

FIG. 4 is an isometric view of the connector 210.

As shown in FIG. 4, the connector 210 may include a housing 211. The housing 211 may include locking grooves 212 on both sides of the housing 211 and a flexible control part 213 at the top of the housing. The flexible control part 213 may include a free end 214 and a fixed end 215 fixed at the top thereof. The free end 214 can be elastically pressed down, thereby causing the flexible control part 213 to swing with respect to the fixed end 215. As a non-limiting example, preferably, the housing 211 may be made of flexible materials. More preferably, the housing 211 may be made of plastic materials.

Optionally, as shown in FIG. 4, the housing 211 may further include pre-locking grooves 216. The pre-locking grooves 216 are located on both sides of the housing 211 and are located behind the locking grooves 212 in the first direction. Preferably, the pre-locking groove 216 is an elongated groove extending in the first direction.

The connector position assurance device 220 is configured movably on the connector 210. Preferably, in order to facilitate the movement of the connector position assurance device 220, a rail or groove may be disposed on the connector 210 (e.g., on the top of the connector 210).

Hereinafter, referring to FIGS. 5A and 5B, it will be explained how to use the connector position assurance device 220 to lock/unlock the connector 210.

Figure 5A:
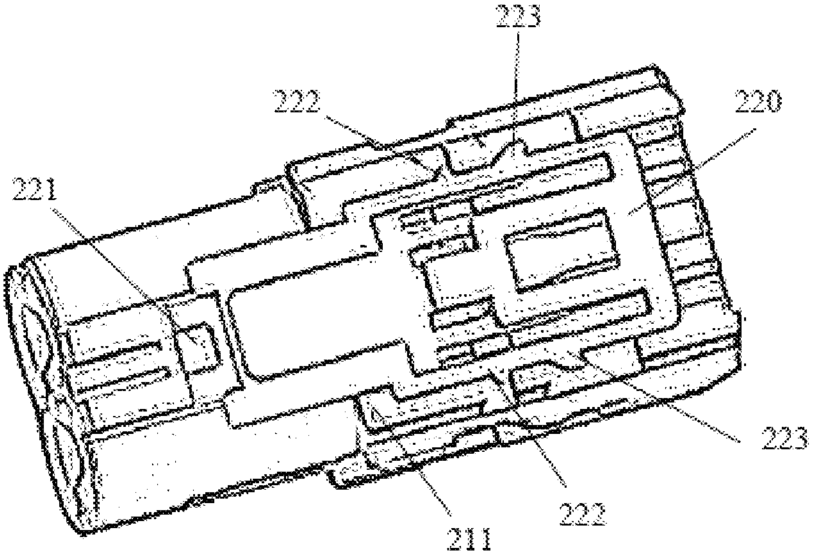
FIG. 5A illustrates a cross-sectional view of the connector assembly along the A-A line of FIG. 3 in the state where the connector position assurance device is in a locking position.
Figure 9A:
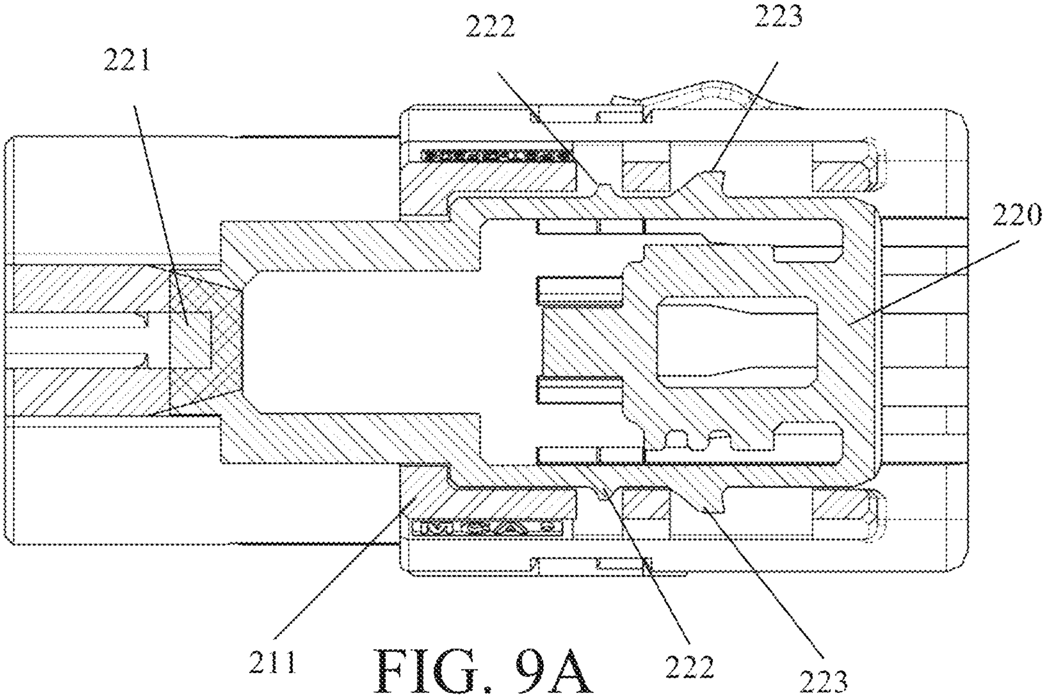
FIG. 9A illustrates a cross-sectional view of the connector assembly along the B-B line of FIG. 8 in the state where the connector position assurance device is in a locking position.

FIGS. 5A and 9A show a cross-sectional view of the connector assembly 200 along Line A-A of FIG. 3 and Line B-B of FIG. 8 respectively in a state where the connector position assurance device 220 is in the locking position. FIG. 5B shows a cross-sectional view of the connector assembly 200 along Line A-A of FIG. 3 and Line B-B of FIG. 8 in a state where the connector position assurance device 220 is out of the locking position.

As shown in FIGS. 5A and 9A, when the connector position assurance device 220 is moved to a locking position, the secondary locking mechanism 222 is snapped into the locking groove 212, and the primary locking mechanism

221 protrudes into the position below the flexible control part 213 and abuts against the fixed end 215, so that the depression of the free end 214 is suppressed.

Figure 5B:
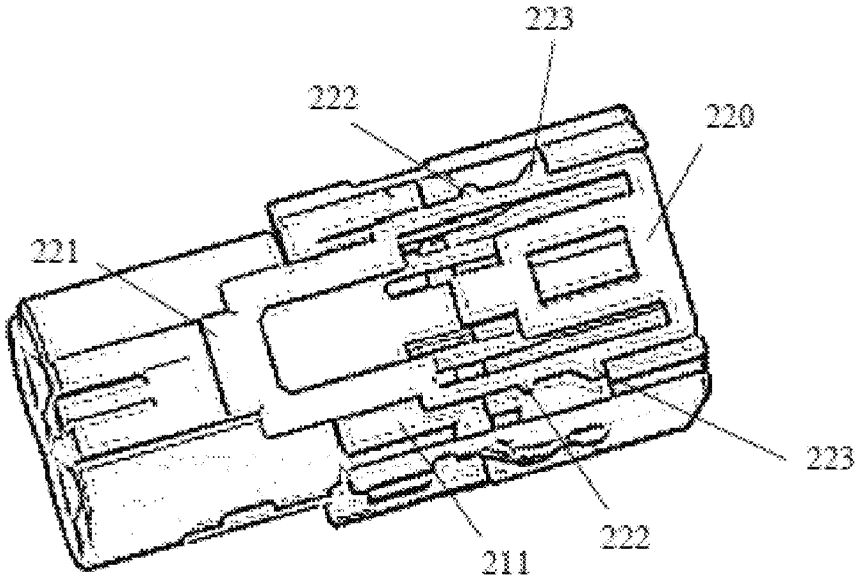
FIG. 5B illustrates a cross-sectional view of the connector assembly along Line A-A of FIG. 3 in the state where the connector position assurance device is out of the locking position.
Figure 9B:
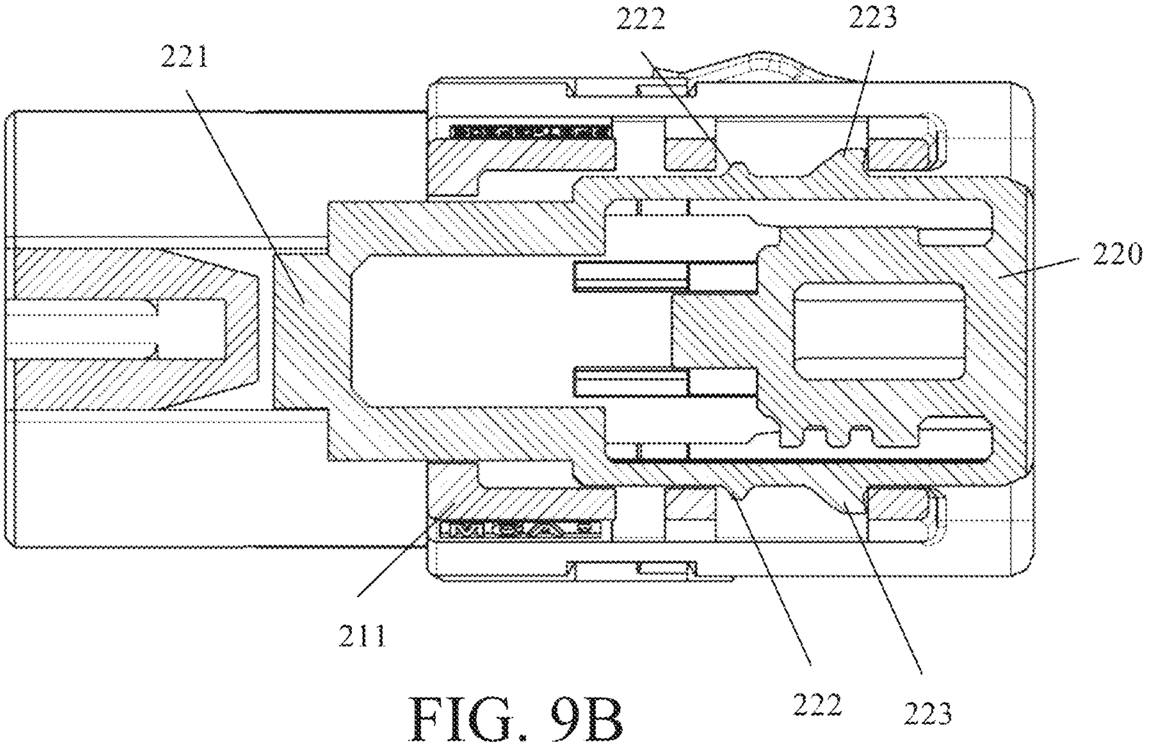
FIG. 9B illustrates a cross-sectional view of the connector assembly along Line B-B of FIG. 8 in the state where the connector position assurance device is out of the locking position.

As shown in FIGS. 5B and 9B, when the connector position assurance device 220 is moved away from the locking position, the secondary locking mechanism 222 slides out from the locking groove 212, and the abutting state of the primary locking mechanism 221 and the fixed end 215 is released, so that the suppression to the depression of the flexible control part 213 is lifted.

Optionally, when the connector position assurance device 220 has the limiting mechanism 223, while the connector position assurance device 220 is moved to a locking position, the free end 214 will be blocked by the limiting mechanism 223 after being pressed down to a certain degree, so that the depression of the flexible control part 213 can be suppressed by the limiting mechanism 223.

Optionally, when the housing 211 has a pre-locking groove 216 and the connector position assurance device 220 has a pre-locking mechanism 224, the connector position assurance device 220 is configured movably on the connector 210 and limits the movement of the connector position assurance device 220 by snapping the pre-locking mechanism 224 of the connector position assurance device 220 into the pre-locking groove 216, so that the connector position assurance device 220 does not move away from the connector 210.

Figure 6:
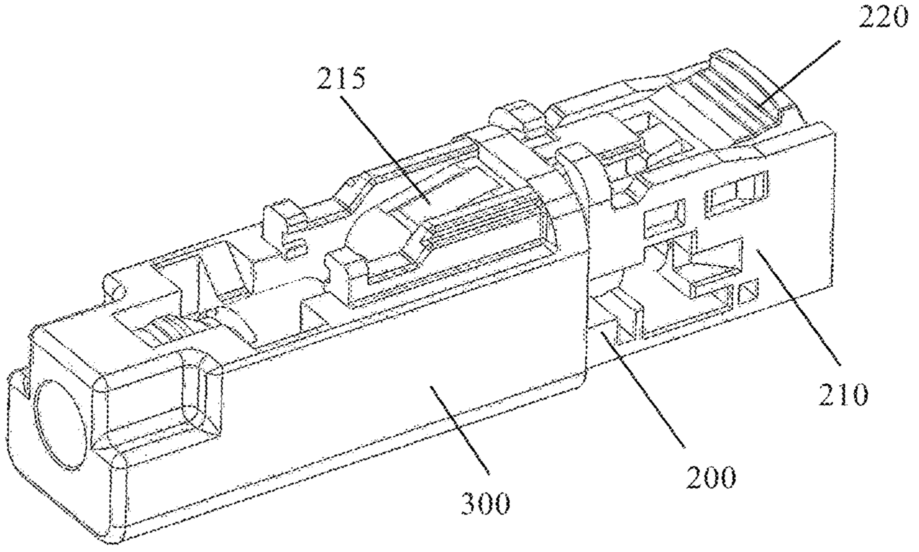
FIG. 6 is a schematic diagram illustrating an exemplary example of connecting the connector assembly to a foreign connector.

As a non-limiting example, FIG. 6 shows an exemplary state of connecting the connector assembly 200 to the external connector 300.

As shown in FIG. 6, after the free end 214 of the flexible control part 213 of the connector 210 is snapped with the corresponding structure of the external connector 300 (i.e., the mating end for mating with the connector), the connector 210 forms a connection with the external connector 300. At this time, if the free end 214 of the flexible control part 213 is pressed down, it can be disengaged from the external connector 300, so that the connector 210 can be disconnected from the external connector 300.

Then, the connector position assurance device 220 can be moved to the locking position, and the depression of the flexible control part 213 is suppressed, such that the connection between the connector 210 and the external connector 300 cannot be disconnected by pressing down the free end 214.

Further, when the connector position assurance device 220 is moved out of the locking position, the suppression to the depression of the flexible control part 213 is lifted, and the connector 210 can be controlled to be detached from the external connector 300 by controlling the depression of the flexible control part 213, thereby disconnecting the connector assembly 200 from the external connector 300.

Therefore, the suppression to the press down of the flexible control part 213 can be controlled by use of movement of the connector position assurance device 220, and in turn the locking/unlocking between the connector assembly 200 and the external connector 300 can be controlled.

Hereinafter, a comparative example of the connector position assurance device 410 and the connector 420 will be described with reference to FIGS. 7A to 7C.

Figure 7A:
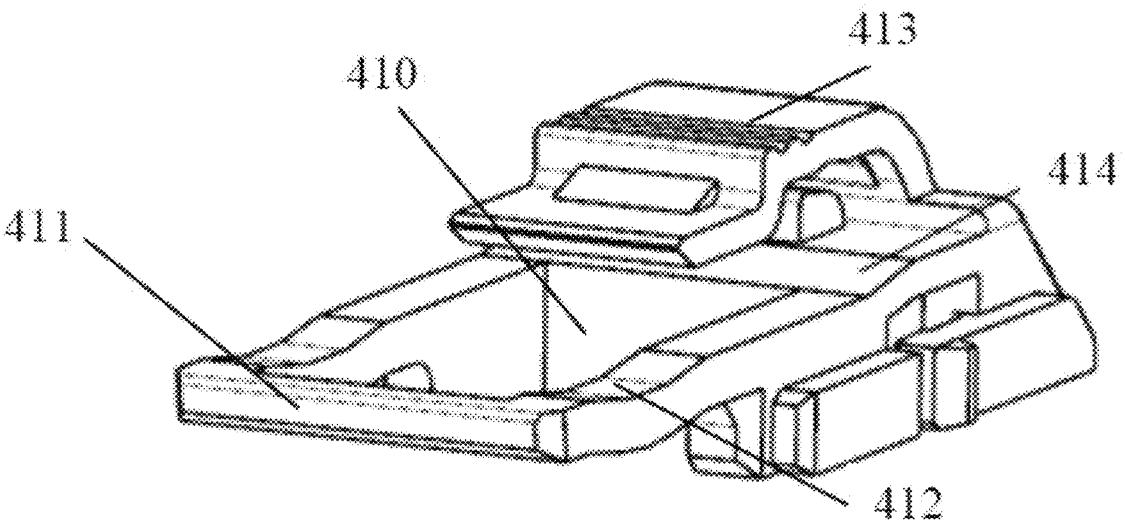
FIGS. 7A-7C are schematic diagrams illustrating a comparison example of the connector position assurance device and the connector.
Figure 7B:
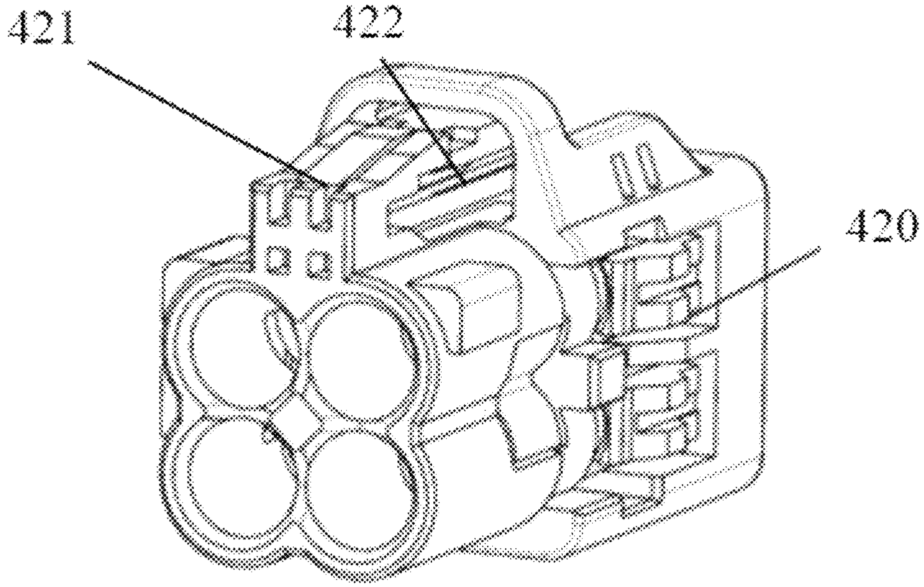
Figure 7C:
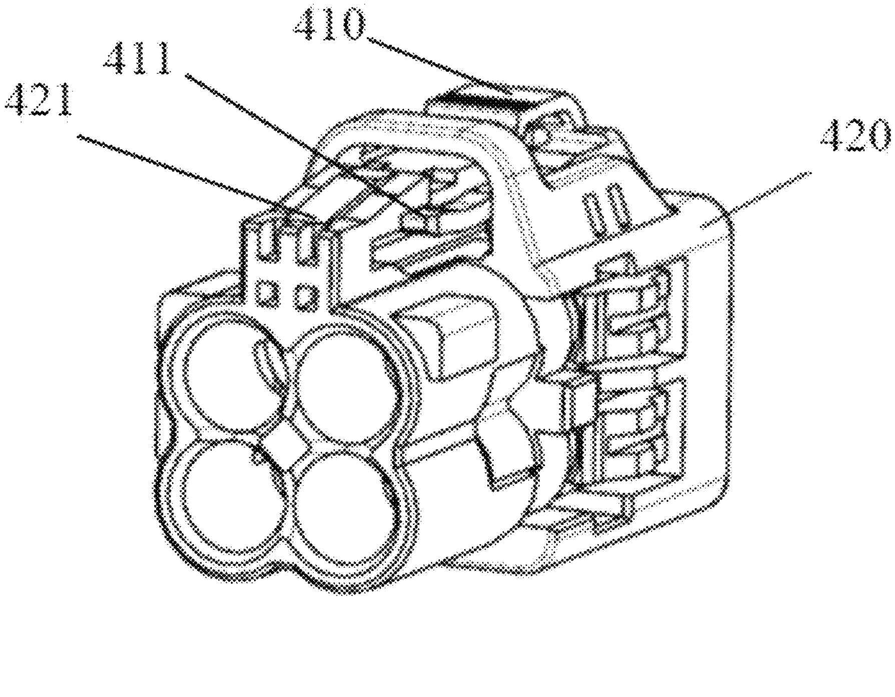

In FIG. 7A, a connector position assurance device 410 is shown as a comparative example. In FIG. 7B a connector 420 is shown as a comparative example. In FIG. 7C, a state where the connector position assurance device 410 and the connector 420 are assembled together is shown as a comparative example.

As shown in FIG. 7A, the connector position assurance device 410 may include a primary locking mechanism 411, a secondary locking mechanism 412, an auxiliary pressing mechanism 413 and a withdrawal mechanism 414. The secondary locking mechanism 412 is in the form of the cantilever beam. As shown in FIG. 7B, the connector 420 may include a flexible control part 421 and a sliding groove 422, wherein the connector 420 can be connected with or disconnected from an external connector (not shown) through the flexible control part 421, and the sliding groove 422 can be used for the connector position assurance device 410 and enable the connector position assurance device 410 to move in the sliding groove 422 in order to fix or lock the flexible control part 421 through the primary locking mechanism 411 when the connector position assurance device 410 is moved to a locking position. As shown in FIG. 7C, the connector position assurance device 410 is mounted movably on the connector 420. When the connector position assurance device 410 is moved to the locking position so that the primary locking mechanism 411 protrudes into the position below the flexible control part 421 and abuts against the flexible control part 421, the flexible control part 421 cannot be pressed down. Therefore, the connector 420 is fixed or locked, thereby preventing accidental disconnection from the external connector due to improper operation or external force.

However, as shown in FIG. 7A, in the connector position assurance device 410, the secondary locking mechanism 412 is in the form of a cantilever beam, which may cause a risk of breakage due to the limited space of the connector position assurance device. In addition, the primary locking mechanism 411 and the secondary locking mechanism 412 are integrated together, and the space is limited, so that the primary locking mechanism 411 is generally small in size, and thus, the blocking force it can provide is small. Further, because the auxiliary pressing mechanism 413 and the withdrawal mechanism 414 of the connector position assurance device 410 are integrated together, this design results in a relatively poor operating feeling.

According to the above-mentioned embodiments, the present disclosure has at least the following advantages:

By employing a simply supported beam portion and/or disposing a pre-locking mechanism (and an optional secondary locking mechanism) on the beam portion, the pre-locking and secondary locking of the connector position assurance device can be made more reliable;

By omitting the auxiliary pressing features, the design of the connector position assurance device can be made simpler, and a slider can be saved on the mold, thereby improving the production efficiency, and reducing the production cost;

By omitting the auxiliary pressing feature, the withdrawal feature of the connector position assurance device is not shared with other features, and the user has a better operating feeling during practical use;

By employing a separate primary locking mechanism and secondary locking mechanism, more space is provided for the primary locking mechanism, thereby increasing the size of the primary locking mechanism, providing greater blocking force, and improving the reliability of the primary locking;

The pull-out force for the connector position assurance device can be significantly increased by the bosses provided on the body.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A connector position assurance device, comprising:

a body;

a primary lock which extends from the body in a first direction and includes a primary locking mechanism at a distal end away from the body; and two beam portions disposed on both sides of the body and extending in the first direction, wherein at least a part of each of the two beam portions is connected to the body, wherein each beam portion includes a secondary locking mechanism that protrudes outwards from an outer side of each beam portion, wherein the body includes a boss between each beam portion and the body, and wherein only one boss defines a recess.

2. The connector position assurance device in accordance with claim 1, wherein the beam portion further comprises a pre-locking mechanism which located behind of the secondary locking mechanism in the first direction.

3. A connector assembly, comprising:

a connector which includes a housing, the housing including locking grooves and pre-locking grooves on both sides, and a flexible control part at a top thereof, the flexible control part including a free end and a fixed end on the top; and the connector position assurance device in accordance with claim 2, wherein the pre-locking groove is located behind the locking groove in the first direction, wherein the connector position assurance device is configured movably on the connector and movement of the connector position assurance device is suppressed by snapping the pre-locking mechanism into the pre-locking groove, and wherein the primary locking mechanism protrudes into the position below the flexible control part and abuts against the fixed end when the connector position assurance device is moved to a locking position, wherein the secondary locking mechanism is snapped into the locking groove so that depression of the flexible control part is suppressed and wherein the secondary locking mechanism slides out from the locking groove, and abutment of the primary locking mechanism and the fixed end is released when the connector position assurance device is moved away from the locking position so that suppression of the depression of the flexible control part is lifted.

4. The connector position assurance device in accordance with claim 1, wherein the primary lock further comprises:

a first arm extending from the body in the first direction; and a second arm extending from the body in the first direction and spaced apart from the first arm.

5. The connector position assurance device in accordance with claim 4, wherein the primary locking mechanism extends between the first arm and the second arm.

6. The connector position assurance device in accordance with claim 4, further comprising:

a limiting mechanism which protrudes from the body along the first direction between the first arm and the second arm.

7. The connector position assurance device in accordance with claim 1, wherein the boss supports a pre-locking mechanism of the beam portion and wherein the pre-locking mechanism is located behind the secondary locking mechanism in the first direction.

8. The connector position assurance device in accordance with claim 1, wherein the boss includes one or more recesses.

9. A connector assembly, comprising:

a connector which includes a housing, the housing including locking grooves on both sides and a flexible control part at a top thereof, the flexible control part including a free end and a fixed end fixed to the top; and the connector position assurance device in accordance with claim 1, wherein the connector position assurance device is configured movably on the connector, wherein the secondary locking mechanism is snapped into the locking groove, and the primary locking mechanism protrudes into the position below the flexible control part and abuts against the fixed end when the connector position assurance device is moved to a locking position so that depression of the free end is suppressed and wherein the secondary locking mechanism slides out from the locking groove and abutment of the primary locking mechanism and the fixed end is released when the connector position assurance device is moved away from the locking position so that the suppression to the depression of the flexible control part is lifted.

* * * * *